FIG_3

Jan. 20, 1959     C. H. NEER     2,869,297
METHOD AND APPARATUS FOR CASING MERCHANDISE
Filed Jan. 31, 1955     11 Sheets-Sheet 5

FIG-5

INVENTOR
Clifford H. Neer,
BY John B. Brady
ATTORNEY

United States Patent Office 2,869,297
Patented Jan. 20, 1959

2,869,297

METHOD AND APPARATUS FOR CASING MERCHANDISE

Clifford H. Neer, Pikesville, Md., assignor to Maryland Engineering Company, Pikesville, Md., a copartnership consisting of William F. McBride and Ruth D. S. McBride Application January 31, 1955, Serial No. 485,059

21 Claims. (Cl. 53—26)

My invention relates broadly to carton packing machines and more particularly to a method and apparatus for the vertical loading of articles into inverted receptacles having means for reversing and discharging the receptacles after loading.

One of the objects of my invention is to provide a novel method of loading receptacles by a vertical upward movement of articles into inverted receptacles.

Another object of my invention is to provide a construction of case packer particularly adapted for packing cans in cartons where the packing procedure is restricted to the vertical introduction of the cans into an inverted carton with the complete elimination of the rolling of the cans in the packing operation for reducing to a minimum the danger of denting the cans, the tearing, scuffing, or mutilating of the printed labels or other insignia of the cans, and/or the agitation of the canned contents which accompanies the customary rolling of such cans into loading position.

Still another object of my invention is to provide a case packer particularly intended for cans where the case packer is "universal" in the sense that it can be adjusted in a short interval of time to accommodate and operate upon any one of a large number of different sizes of cans A further object of my invention is to provide a construction of case packer which may be adjusted to operate upon a wide range of can sizes and yet have a comparatively small number of replacement parts which are standardized to simplify repair and replacement.

A further object of my invention is to provide a case packer including means for insuring operation of the packer only at the instant that the required number of cans are moved into loading position so that it becomes impossible for a carton to be loaded with one or more cans omitted.

Another object of my invention is to provide an arrangement of two cam operated plungers arranged to independently operate upon the successive layers of articles to be vertically loaded into an inverted carton including means for timing the operation of the plungers for effecting the successive loading of the articles in layers.

A further object of my invention is to provide a carton reversing means for discharging a carton after loading in inverted position for delivery right-side up.

Other and further objects of my invention reside in the construction of means for properly aligning articles to be packed in rows in an inverted carton and timing the series of operations incident to the vertical loading of the cartons, all as set forth in the specification hereinafter following by reference to the accompanying drawings, in which.

My invention is directed to a caser for labelled articles where the object of the caser is to eliminate tearing or scuffing of labels or the injury of the packaged articles, or the agitation of the contents of the articles; and also to provide for universal operation of the caser in the sense that the caser can be adjusted to accommodate the machine to the casing of any one of a large number of different sized articles. My invention also contemplates a construction of caser having relatively small number of parts and wherein maintenance and repair on a number of caser installations operating on differently sized articles may be considerably reduced by use of replacement parts applicable to all of the casers, regardless of the article sizes to which the individual casers are adjusted. For purposes of illustration of my invention, I have shown the caser applied to the packing of cans in cartons but it will be understood that the caser has application to various types of articles and packages and is not restricted to the casing of cans.

The caser of my invention employs a vertical loading arrangement for packing cartons in inverted position by vertical upward movement of the articles to be cased for insertion into the inverted carton which, when loaded, is reversed to a right-side-up position and discharged. I provide an arrangement by which the operation of the caser is deferred until the entire complement of articles to be cased has been moved into position. This precludes operation of the caser with the omission of some of the articles. Thus it is impossible for a carton to pass through the caser with one or two articles omitted.

My invention provides means for guiding the cans or articles to be cased into casing position and means for adjusting the width of the rows into which the articles or cans to be cased are segregated for insuring substantially continuous operation of the caser with the accompanying economy in operation. The caser of my invention has successfully operated in filling cartons of two dozen can capacity at the rate of eighteen to twenty-four cases per minute. However, my invention has been developed with emphasis on the quality of control rather than speed of operation.

Figure 1:
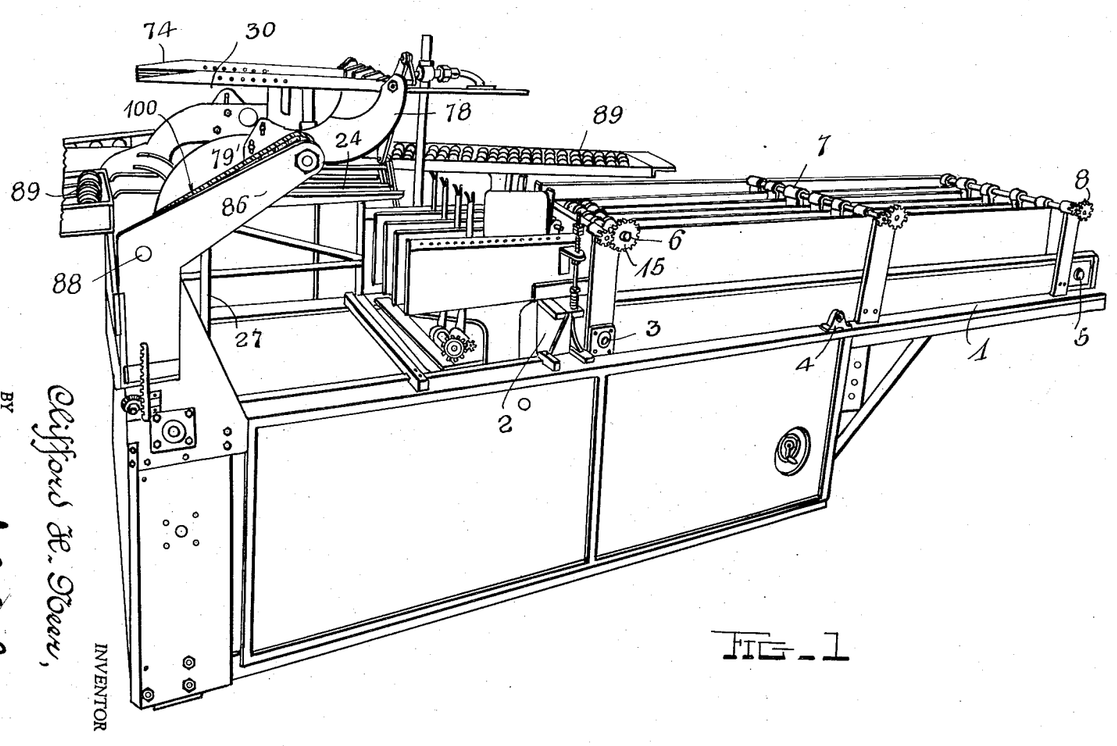
Fig. 1 is a perspective view of the case packer of my invention arranged for loading four rows of cans, three deep, in an inverted carton and illustrating particularly the mechanism for reversing the packed carton for discharging the carton, right-side up, fully loaded, with two layers of cans.
Figure 2:
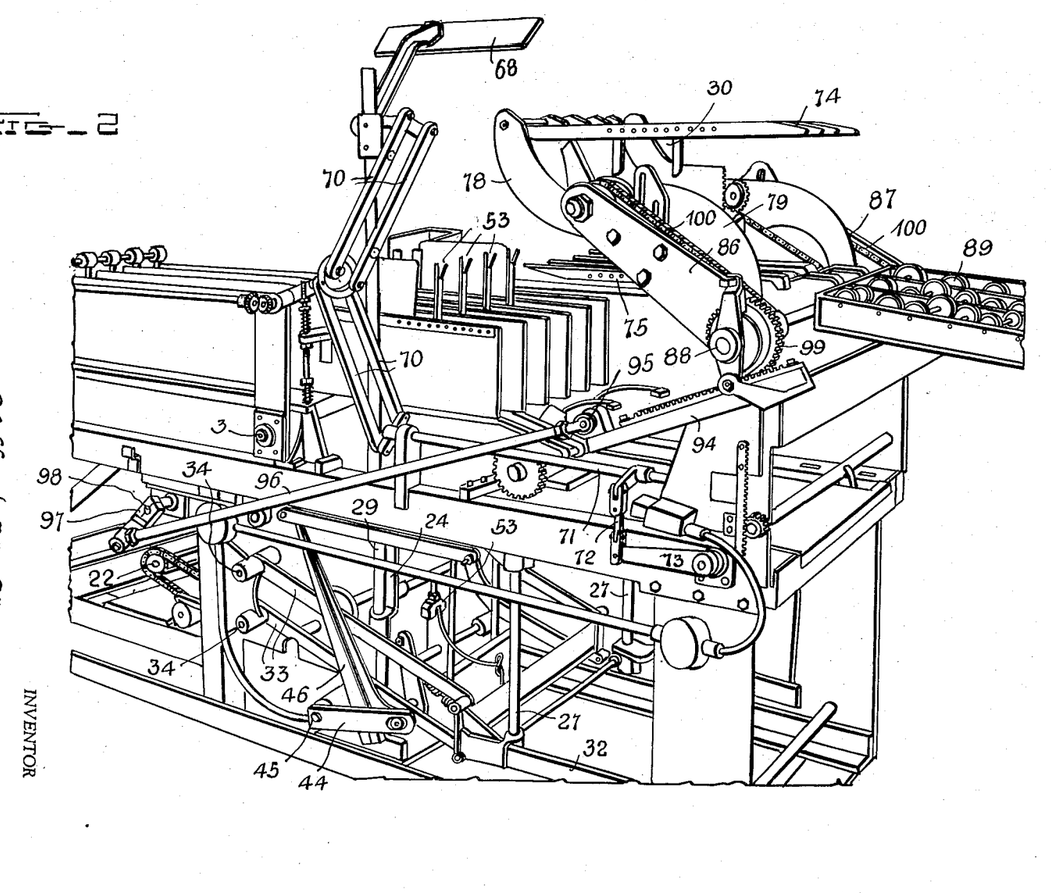
Fig. 2 is a perspective view of the case packer looking in the direction opposite to the direction in which the view shown in Fig. 1 is taken, and illustrating more particularly the arrangement of the main plunger operative for raising a double tier of cans into an inverted carton.
Figure 3:
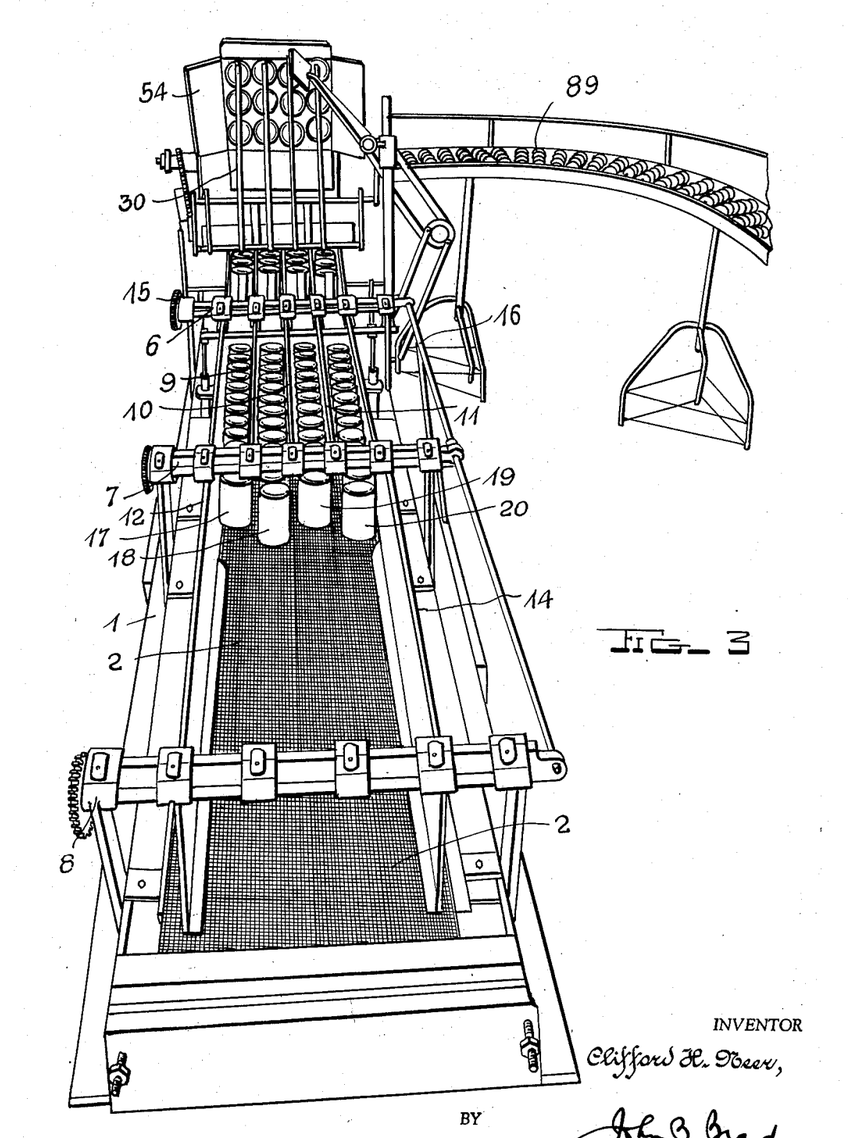
Fig. 3 is a perspective view of the case packer of my invention viewed from a position above the end of the in-feed conveyor and illustrating particularly the aligning means for the articles to be packed and showing a double tier of cans about to be elevated at the position occupied by an inverted carton, and also illustrating a completely packed carton about to be discharged right-side up onto the discharge conveyor.
Figure 4:
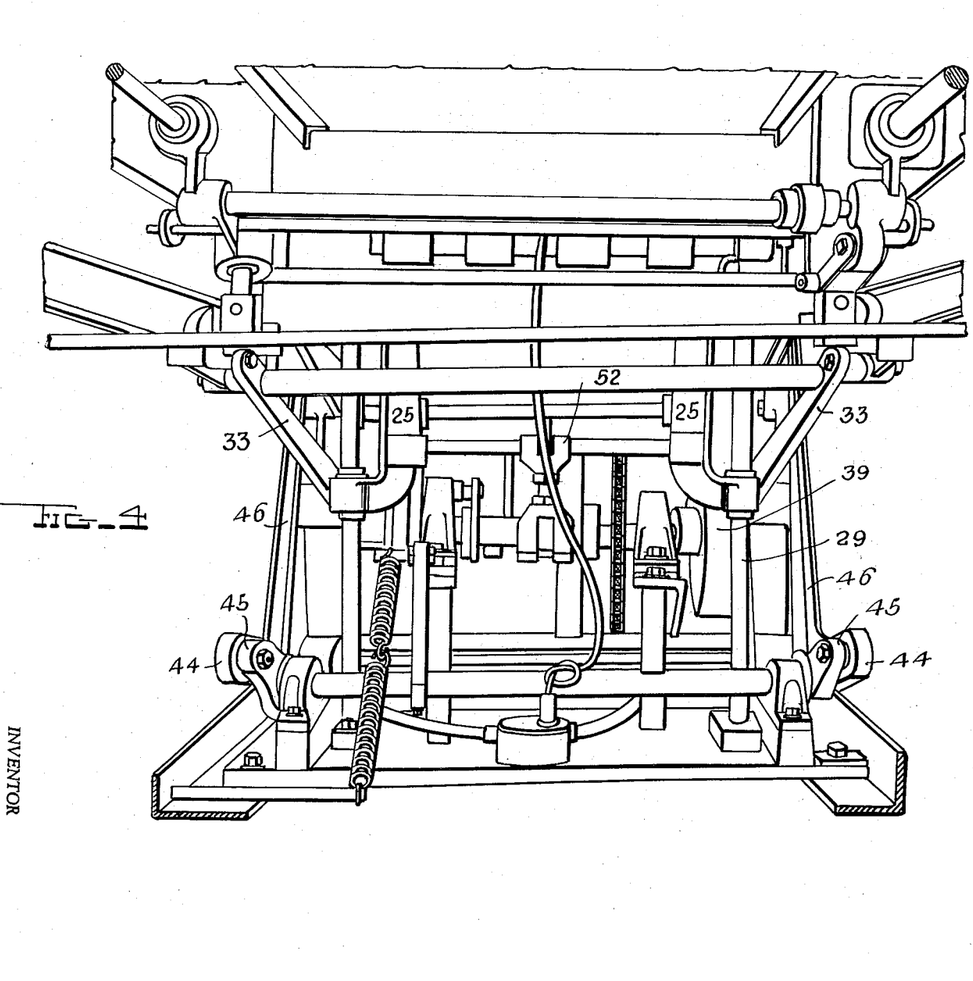
Fig. 4 is a fragmentary transverse perspective view taken below the level of the article conveyor showing the relationship of the auxiliary and main plunger operated mechanism for the caser.
Figure 5:
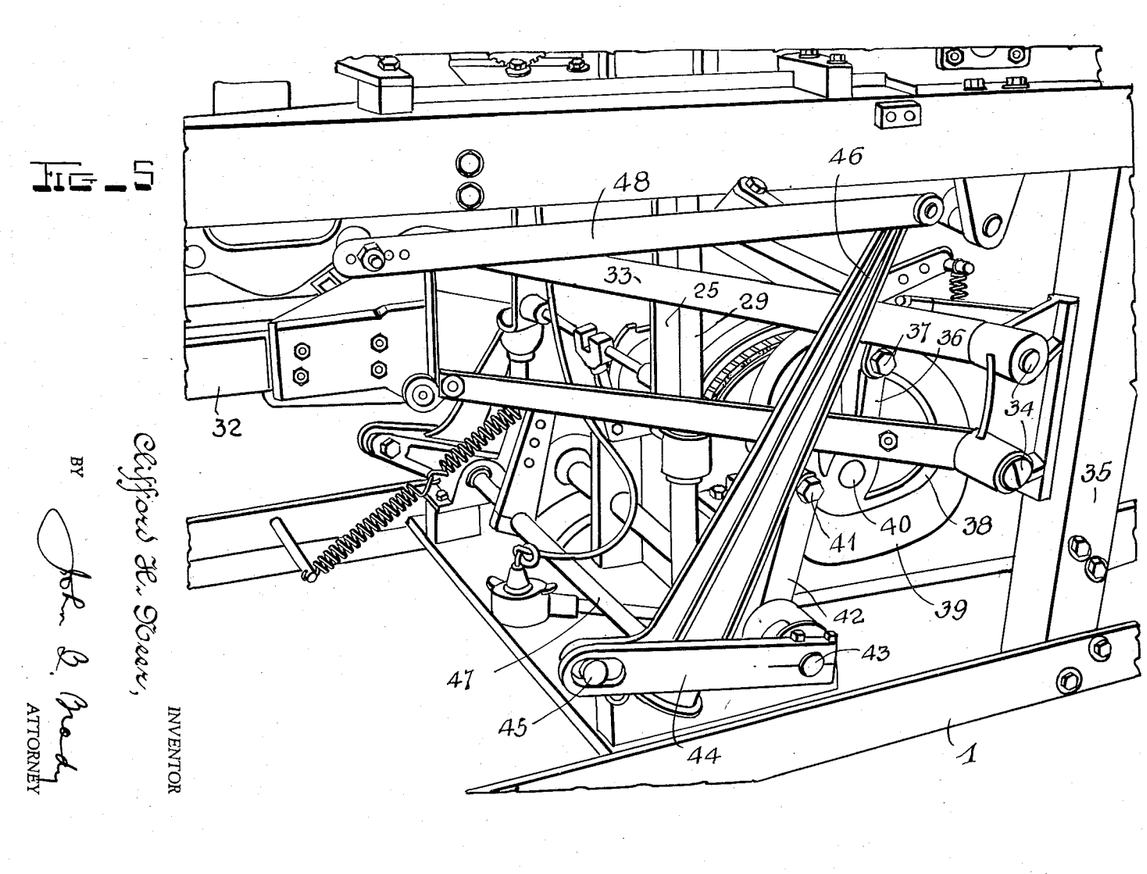
Fig. 5 is a perspective view taken from one side of the case packer of my invention and illustrating the position of the mechanism when the main plunger is elevated to raised position, and showing the auxiliary plunger lowered.
Figure 6:
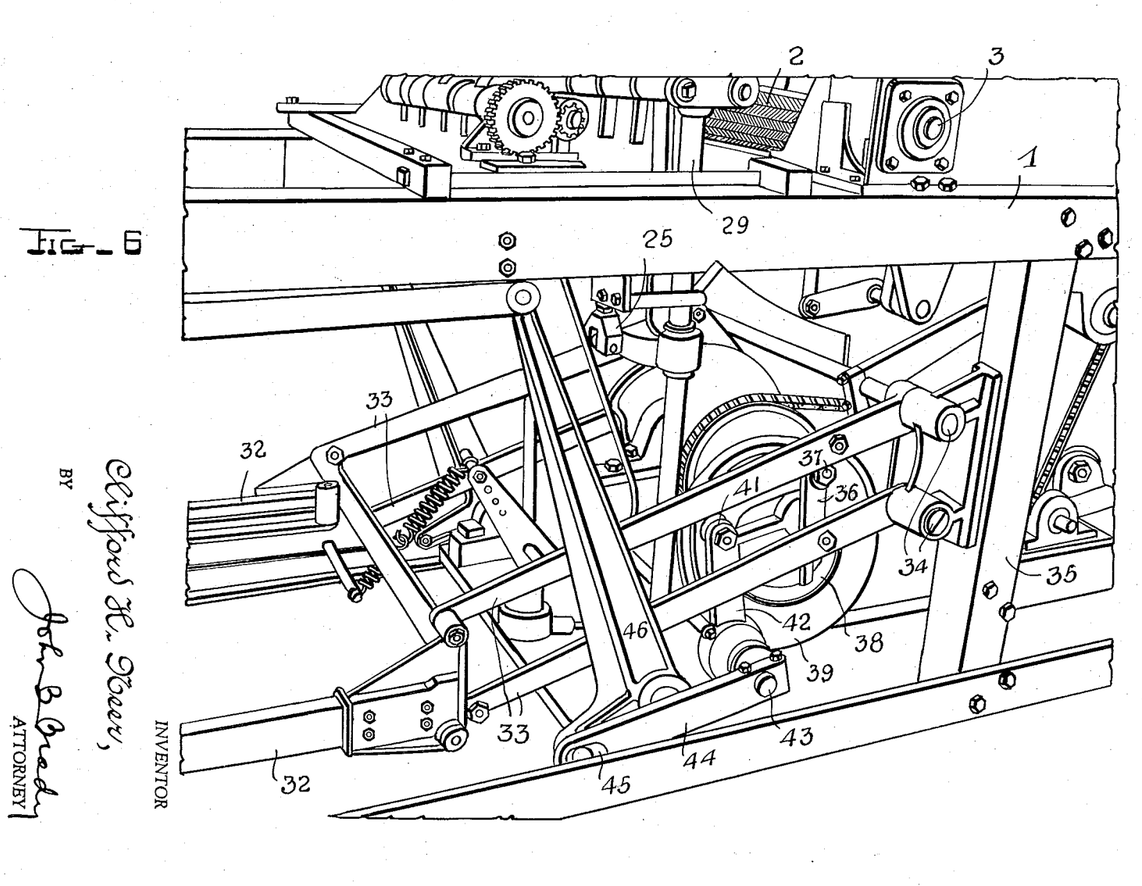
Fig. 6 is a perspective view similar to the view shown in Fig. 5, but illustrating the position of the mechanism with the main plunger lowered and with the auxiliary plunger elevated.

Referring to the drawings in more detail, reference character 1 designates the main frame of the caser developed for the packing of labelled cans where the main frame supports an endless conveyor shown more clearly in Fig. 3, at 2, operative over rollers carried by transversely extending shafts indicated, in Figs. 1, 2 and 6, at 3, 4 and 5. Arranged over the endless conveyor 2, I provide a series of three adjustable screw assemblies 6, 7 and 8 which adjust the separator plates represented at 9 and 11 on opposite sides of a central stationary separator plate 10 within the limits of the side plates 12 and 14 and disposed above the side plates 12 and 14 and the separator plates 9, 10 and 11. The screw assemblies 6, 7 and 8 are controlled for simultaneous operation through an adjustable hand wheel 15 and a shaft 16 geared with each of the screw assemblies 6, 7 and 8. By use of a 2 to 1 ratio gear arrangement, plates 9 and 11 move ½x distance while plates 12 and 14 move x distance thus keeping the canline channels always the same width. Parallel movement is imparted to the separator plates 9 and 11 for guiding the cans into casing position in rows which I have indicated at 17, 18, 19 and 20. The conveyor 2 is driven from an electric motor indicated generally at 21 which drives a clutch or jack shaft 22 connected with the main shaft 40 which is connected through clutch 23 and countershafts, gears, and sprocket chain drives, to the several shaft assemblies and timing cams which I have combined for properly timing the operation of the several parts of the caser mechanism. The side plates 12 and 14 and the separator plates 9, 10 and 11 extend beyond the end of conveyor 2, past the casing position represented particularly in Figs. 1, 2 and 3, and over the position occupied by the main plunger 24 and the auxiliary plunger 25 at the funnel chute 59. The main plunger 24 which traverses a path of a 4-sided parallelogram is alternately under the funnel chute 59 or displaced horizontally from the funnel chute 59. Both the main plunger and the auxiliary plunger consist of horizontally extending fingers which interleave or alternate with each other and together provide a horizontal support extending in a horizontal plane coplanar with the top of the feed conveyor 2 so that articles or cans can be moved off of the conveyor 2 and onto the top of the horizontal support formed by the alternating fingers of the main plunger 24 and the auxiliary plunger 25. The fingers constituting the main plunger 24 are interconnected by a transverse bar represented at 26 connected by vertically extending members represented at 27 in Figs. 2 and 7. The auxiliary plunger 25 has the several fingers thereof interconnected by transverse member 28 which is raised and lowered with respect to vertically extending members 29. Movement of the auxiliary plunger is confined to a vertical path only. The main plunger 24 is arranged not only for vertical movement but also for movement in a horizontal plane for transferring the loaded carton from the casing position to the rotary case discharge mechanism 30. This is accomplished by providing the vertically extending members 29 with rollers 31 which engage horizontal roller tracks 32.

The horizontal roller tracks 32 are carried by the projecting ends of the main plunger cam levers 33. The main plunger cam levers 33 are pivoted at spaced positions 34 on one of the vertically disposed members 35 of the main frame 1 of the machine. The main plunger cam levers 33 have a cross bar 36 pivotally connected therewith, which cross bar carries a roller member 37 which engages the cam-shaped groove 38 of the main plunger cam 39. The main plunger cam 39 illustrated in Fig. 6 at one end of the main shaft 40 controls both the vertical up and down movement of main plunger 24, and also the horizontal movement thereof. The horizontal movement is controlled through roller member 41 which also engages the cam-shaped groove 38 in cam 39, and moves crank arm 42 which is mounted to move the shaft 43 which carries the arm 44 which is loosely coupled at 45 to the main plunger horizontal movement levers 46, adapted to orient about the shaft 47 as a center. Main plunger horizontal movement levers 46 connect with adjustable links 48 with the guide members 49 which engage the vertically extending members 27 which are arranged to move in a vertical plane as roller members 31 roll along horizontal roller tracks 32, whereby main plunger 24 may be moved in a horizontal path for carrying a loaded carton from the casing position to the rotary case discharge mechanism.

Figures 8, 9:
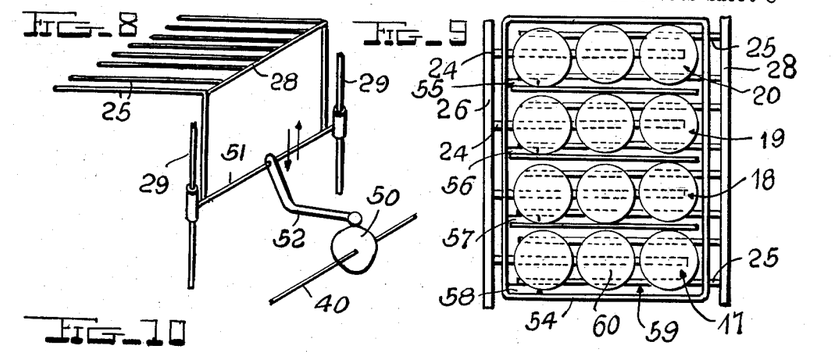
Fig. 8 is a schematic perspective view showing the operation of the auxiliary plunger in the case packer of my invention.
Fig. 9 is a top plan view schematically showing the coaction of the auxiliary plunger with the main plunger in the structure of my invention.
Figure 10:
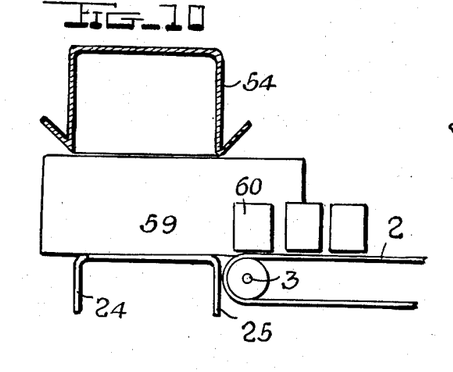
Fig. 10 is a schematic view showing the caser in a position about to advance the first layer of articles to be cased into casing position.

The operation of the auxiliary plunger 25 is shown more fully in Fig. 8, from which it will be seen that the cam 50 mounted on shaft 40 is arranged in such manner that the timing of the movement of the auxiliary plunger 25 with respect to the vertically extending members 29 is controlled through a vertically movable transverse bar 51 connected through a motion-transmitting arm 52 which engages cam 50 for lifting the auxiliary plunger 25 in proper timing relation to the operation of the main plunger 24.

In order to mount an empty carton in the casing position, I provide upstanding vertical supports 53 which support the carton indicated schematically at 54, in Figs. 10-21.

Figures 22, 23, 26:
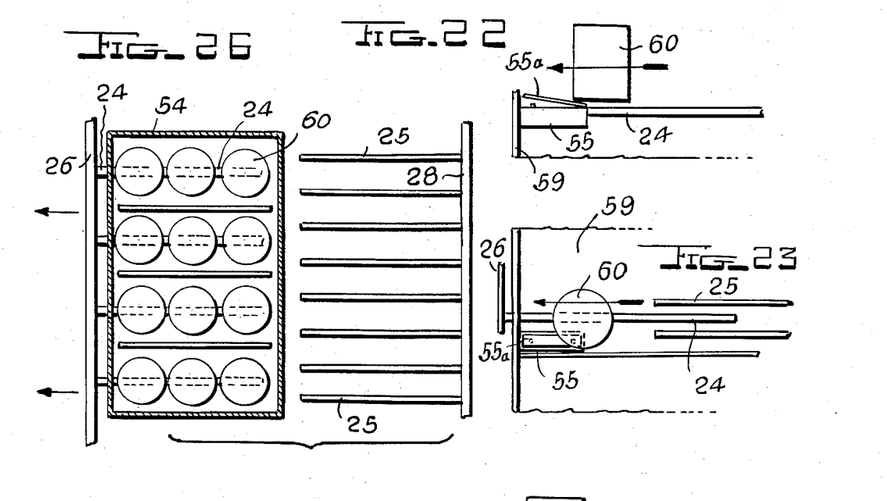
Fig. 22 is an enlarged fragmentary elevational view of one of the circuit controlling switches for insuring the complete loading of the caser.
Fig. 23 is a plan view of the arrangement illustrated in Fig. 22.
Fig. 26 is a schematic explanatory plan view showing the relative position of the main plunger supporting the loaded reversed carton at the instant the main plunger moves in a translatory horizontal path away from the auxiliary plunger.
Figures 24, 25:
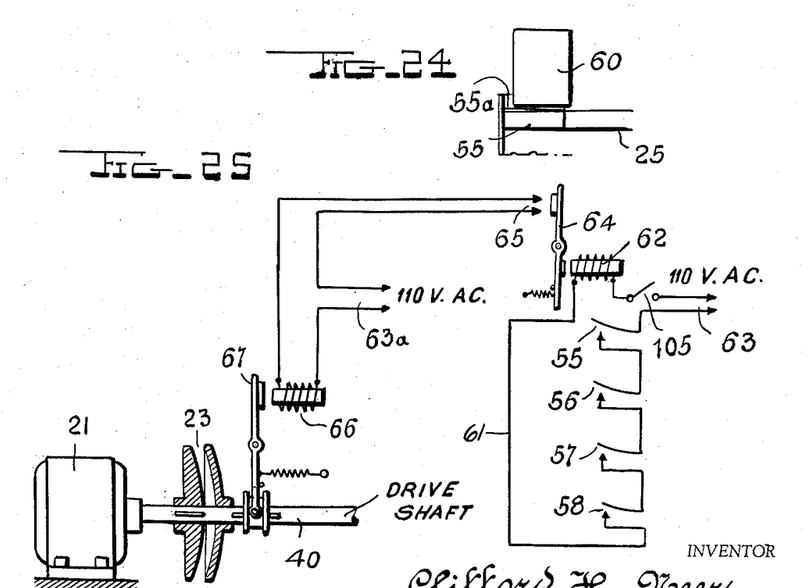
Fig. 24 is a view similar to the view shown in Fig. 22 and illustrating the operation of the electrical control switch in one of the loading rows necessary before the control circuit of the caser can be conditioned.
Fig. 25 is a schematic view illustrating the manner of operation of the control switches by the articles in all of the rows of the caser necessary before the caser may go into operation.

In order to insure the operation of the caser with complete loading of the carton I provide the control switch arrangement shown particularly in Figs. 9 and 22-25, wherein pressure operated switches 55, 56, 57 and 58 are located at the end of the row in each of the rows within the caser compartment, represented at 59 in Fig. 9. As represented in Figs. 22-24 the cans, represented for example by reference character 60, advancing along the aligned main and auxiliary plungers 24 and 25, must slide over the pressure operated member 55a of switch 55, for example, to the limit position represented in Fig. 24, before the circuit through switch 55 is closed.

Reference to Fig. 25 will show that the pressure operated switches in rows 17, 18, and 19, represented at 58, 57 and 56, must all be closed before the series circuit through the control circuit, represented at 61, is complete, which then permits solenoid 62 to be energized from power source 63 for moving armature 64 to a position for closing contact 65, thereby completing the circuit to power source 63a, to solenoid 66 which operates clutch member 67, for moving clutch 23 into engaged position for connecting the drive shaft of the caser to the motor 21, thereby enabling the caser to go into operation. This series path, however, must be completed through all pressure operated switches, and this cannot be done until all of the cans have been moved into the rows 17, 18, 19 and 20 in the caser section 59.

The empty carton 54 is maintained in position over the funnel chute 59 by means of the carton flap holder 68 which is adjustably mounted on vertically extending member 69 and is controlled through the arms 70 through shaft 71 and operating linkage 72—73 for operation while the carton is being packed and for release after the carton has been filled and preparatory to a discharge operation.

Figure 7:
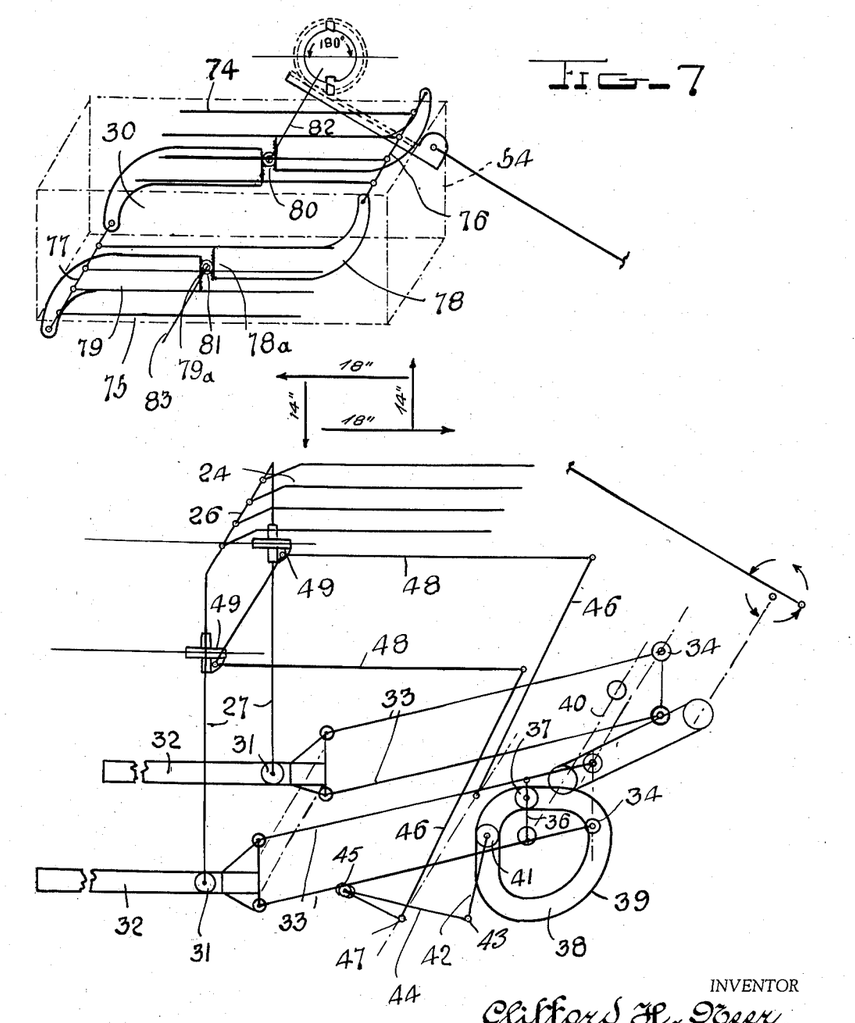
Fig. 7 is a schematic view illustrating the timed mechanism for controlling the main plunger and illustrating the relationship of the main plunger to the discharge unit of the case.

The rotary case discharge mechanism is shown at 30 and consists of a pair of carton supporting members designated at 74 and 75 supported by transverse bars 76 and 77, respectively. These transverse bars are carried in side frames designated at 78 and 79, respectively, which frames are adjustable toward and away from each other through rack teeth formed on the abutting ends 78a and 79a of the side frames 78 and 79, and engaged by pinions 80 and 81. The pinions 80 and 81 are carried by stub shafts 82 and 83 which are individually and simultaneously operated through sprocket chains 84 and 85, indicated schematically as rack drive mechanism in Fig. 7, whereby a 180° movement may be imparted to the rotary case discharge mechanism 30 in timed relation to the movement of the main plunger 24 and auxiliary plunger 25. The showing in Fig. 7 is simply schematic as there are separate drives for each of the side frames and these drives are symmetrical on opposite sides of the carton with adequate space between the members 74 and 75 for introducing the carton. Thus the members 74 and 75 may be adjusted to the proper widths for enabling a carton 54 to slide into and to be supported while the carton is being reversed in position and discharged right-side-up. A clearance of approximately ¼" is provided between the dimensional limits of the carton and the planes of members 74 and 75.

The rotary case discharge mechanism 30 is mounted on arms 86 and 87 and the loaded carton as represented in Fig. 2, revolved from the reversed position to a right-side-up position for discharge onto conveyor 89. As represented in Fig. 7, the movements involved consist of an elevation of the two tiers of cans in a vertical direction for a distance, in the particular example shown, of approximately 14" and then a forward movement of approximately 18" in a horizontal direction for transferring the loaded carton from the funnel chute position 59 to the rotary case discharge mechanism 30. When the carton is released from the caser the main plunger is then lowered for a vertical distance of approximately 14" and returned in a horizontal direction of approximately 18" preparatory to a re-cycling operation for the loading of the next carton.

By combining the illustration of the main plunger 24 in Fig. 7, with the auxiliary plunger 25 in Fig. 8, the coordinated operation of the plungers will be understood. The rotary case discharge mechanism 30 is orientatable on arms 86 and 87 around shafts 82 and 83 as pivots from the position adjacent the discharge end of the caser to a position over the end of conveyor 89 where the carton 54 is discharged right-side-up onto the gravity conveyor 89.

Fig. 9 makes clear in plan view the coaction of main plunger 24 with auxiliary plunger 25 in the funnel chute 59 and particularly the manner in which series connected switches 55–58 are actuated by the movement of the cans 60.

Figs. 10-21 make clear the successive steps in the casing operation. That is to say, in Fig. 10, the empty carton 54 is arranged in inverted position over the funnel chute 59 and the main plunger 24 and auxiliary plunger 25 are horizontally coplanar for receiving the cans 60 as they advance from the conveyor 2.

Figures 11, 13:
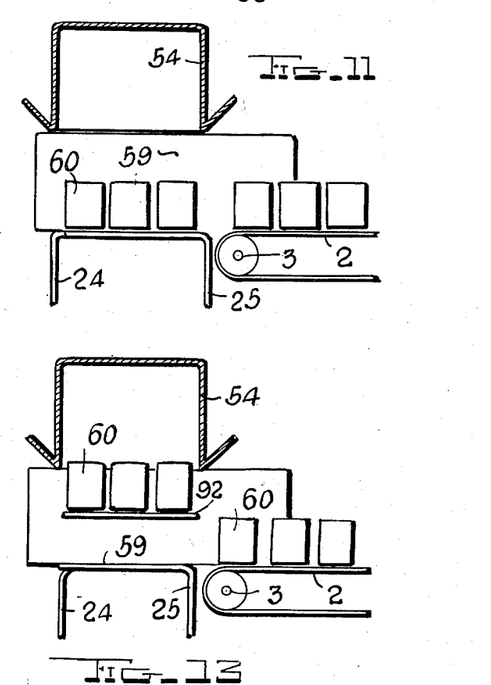
Fig. 11 shows the next progressive step in the casing operation where the articles to be cased have been moved into position ready for vertical elevation into the inverted carton.
Fig. 13 illustrates the step in which the auxiliary plunger has returned to the initial position, leaving the first layer of articles to be cased supported in elevated position.
Figure 12:
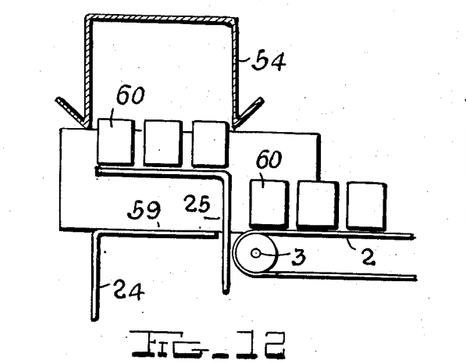
Fig. 12 illustrates schematically the next progressive step wherein the auxiliary plunger has vertically raised the first layer of articles into casing position.

In Fig. 11, cans 60 have advanced into the funnel chute 59. In Fig. 12 the cans 60 have been raised by the auxiliary plunger 25 to form the first layer of cans to be inserted into the inverted carton 54. In Fig. 13 the cans 60 have been latched into an elevated position by spring-actuated latch members shown more particularly in Fig. 14 at 90, 91, 92 and 93. These latch members 90–93 are respectively mounted in side plate 12, separator plate 9, separator plate 11, and side plate 14 as indicated more clearly in Fig. 14. The latch members constitute strips 90, 91, 92 and 93 and these are yieldingly mounted and biased by springs 90a, 91a, 92a and 93a to move into an outward position so that as cans 60 are elevated upwardly by auxiliary plunger 25 the latch members 90–93 are shifted laterally enabling the cans to pass vertically upwardly, but as soon as the cans have passed beyond the latching members 90–93 these latching members spring outwardly due to the spring-biased mounting thereof and latch beneath the cans, precluding the can from dropping downwardly. I have shown this operation more clearly in Fig. 27 and in Fig. 28 I have shown a modified arrangement where the latching members as represented at 90 are simply gravity biased and are displaced sidewise as the cans are pushed up and fall into latching position by gravity.

Figure 15:
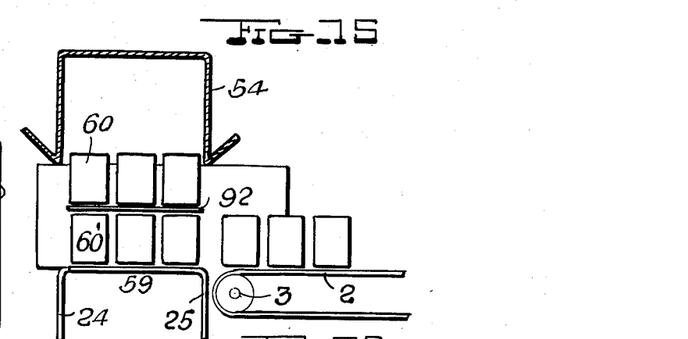
Fig. 15 illustrates the manner in which the second layer of articles to be cased is moved into position beneath the elevated first layer of articles to be cased.

In Fig. 15 I have shown the manner in which the second tier of cans shown at 60′ is moved beneath the tier of cans 60 onto the main plunger 24 and the auxiliary plunger 25 maintained in coplanar horizontal relation.

Figure 16:
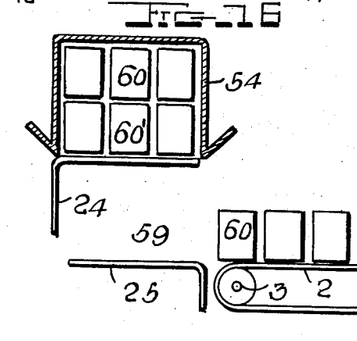
Fig. 16 schematically illustrates the manner in which the main plunger elevates both layers of articles to be cased vertically into the inverted carton.

In Fig. 16 I have shown the manner in which the main plunger 24 raises both tiers of cans 60 and 60′ into the inverted carton 54.

Figure 17:
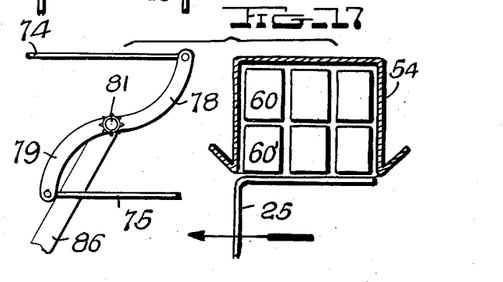
Fig. 17 illustrates the manner in which the inverted carton, containing the inserted articles to be cased, is moved into position for delivering the inverted carton to the rotary case discharge mechanism.

In Fig. 17 I have shown the manner in which auxiliary plunger 25 serves as a carrier for the loaded inverted carton and moves in a horizontal direction to the rotary case discharge mechanism 30 where the arms 86 (87) are angularly inclined to align the rotary case discharge mechanism 30 for receiving the inverted loaded carton 54 which slides between the members 74 and 75.

Figure 18:
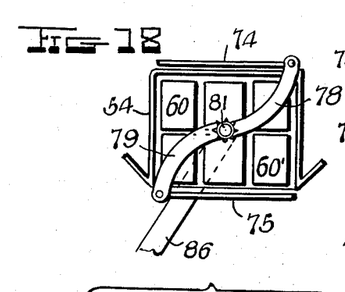
Fig. 18 schematically illustrates the manner in which the inverted carton is slipped in the rotary case discharge mechanism.

In Fig. 18 I have shown the step wherein the inverted loaded carton 54 has been slid between the members 74 and 75 of the rotary case discharge mechanism 30 and the main plunger 24 has returned empty and has moved downwardly to its initial restored position below funnel chute 59.

Figures 19, 20:
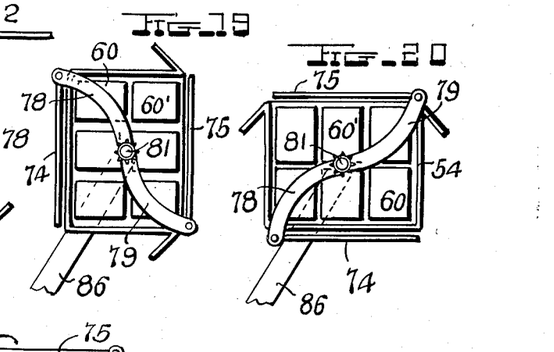
Fig. 19 shows the manner in which the inverted carton is revolved for reversing the carton preparatory for discharge.
Fig. 20 shows the position of the loaded carton moved by the rotary case discharge mechanism into right-side-up position.

Fig. 19 represents the step in which rotary case discharge mechanism 30 is orienting to restore the loaded carton 54 to right-side-up position.

Fig. 20 shows the carton moved to right-side-up position in the rotary case discharge mechanism 30.

Figure 21:
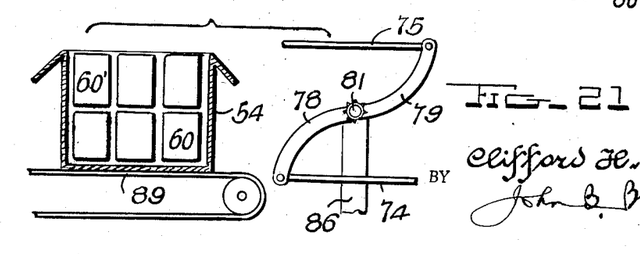
Fig. 21 illustrates the step of discharging the loaded carton onto the discharge conveyor.

Fig. 21 shows the rotary case discharge mechanism 30 in right-side-up position in alignment with discharge conveyor 89 where the loaded carton 54 is slid outwardly for discharge onto conveyor 89 for movement of the carton right-side-up into sealing position preparatory to storage or shipment.

The orientation of the discharge mechanism 30 is controlled through rack 94, pivotally connected at 95 with the operating rod 96 which is driven through crank 97 from shaft 98 which is operated in timed relation to the movement of the main plunger 24 and auxiliary plunger 25. The gears 99 on shaft 88 and sprocket chains 100 move 80 and 81, depicted in Fig. 7, for revolving the discharge mechanism 30.

The caser of my invention is readily usable in packing merchandise in either a single or double tier. I have hereinbefore explained the procedure with respect to the double tier operation. When it is desired to pack only a single tier of merchandise the auxiliary plunger 25 is de-activated by removing motion transmitting arm 52, shown more clearly in Fig. 8, so that cam 50 is no longer effective for raising and lowering the auxiliary plunger 25. However, the main plunger 24 continues to be effective and the single tier of merchandise is raised into an inverted packing carton by the main plunger 24. Under these conditions it is not necessary for the merchandise to be latched into an elevated position but is moved directly into the inverted carton and then the inverted carton thus loaded moved horizontally to the case discharge mechanism 30 after which the operations are as heretofore explained.

Whether the merchandise is packed in a single tier or a double tier the carton flap-holder 68 is effective through arms 70. The movement of arms 70 serves to control a power switch 105 shown schematically in Fig. 25 which is closed when the flap-holder 68 is properly pressed downwardly against the bottom of the carton 54. When the power switch 105 is closed the series circuit through the switches 55—58 may be completed by the closing of the said micro-switches as soon as all of the cans in rows 17, 18, 19 and 20 have been moved into the funnel chute 59.

Figure 14:
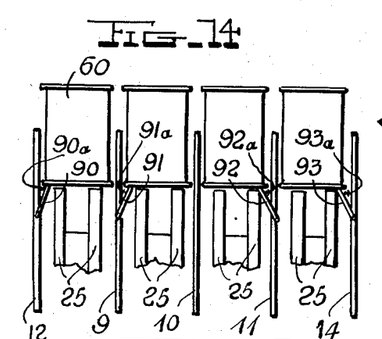
Fig. 14 is a schematic transverse sectional view showing how the articles to be cased are maintained in an elevated position enabling the auxiliary plunger to return to initial position.
Figure 27:
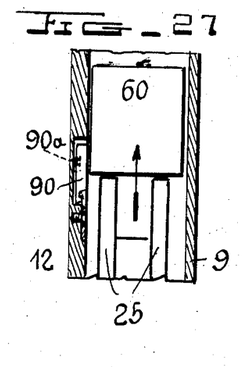
Fig. 27 is an enlarged view of one mechanism for latching the articles to be packed in elevated position the view showing the auxiliary plunger in the process of raising the article to a position above the latch.

In Fig. 27 I have shown an enlarged view of the mechanism for latching the articles to be packed in elevated position where the auxiliary plunger 25 is elevating can 60 into latching position which is the condition illustrated in Figs. 13 and 14. It will be observed that latch 90 is yieldingly pressed inwardly by can 60 as can 60 is raised between side wall 12 and separator plate 9. The latch 90 moves against the resiliency of spring 90a which immediately presses the latch 90 outwardly after can 60 has passed as shown in Fig. 28, whereupon can 60 is held in elevated position while auxiliary plunger 25 is lowered to re-cycling position.

Figures 28, 29:
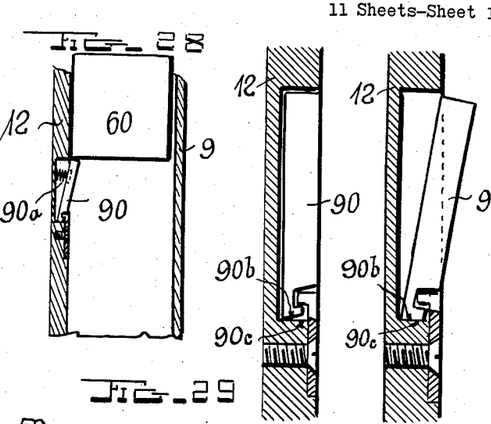
Fig. 28 is a view similar to Fig. 27 but illustrating the article resting on the latch and the auxiliary plunger returned to reloading position.
Fig. 29 shows a modified form of article latching mechanism in which the latch is gravitationally biased, the view showing the gravitational latch in a position permitting the upward movement of the articles under control of the auxiliary plunger.
Figures 30, 31:
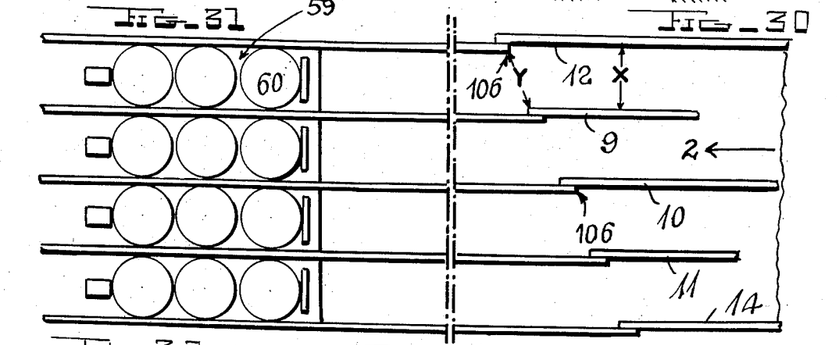
Fig. 30 is a view similar to Fig. 29 but illustrating the latch gravitated to latching position for holding an article in elevated position.
Fig. 31 is a plan view showing in detail the means for insuring the delivery of cans to the funnel chute in standing position ready for casing.
Figures 32, 33, 34:
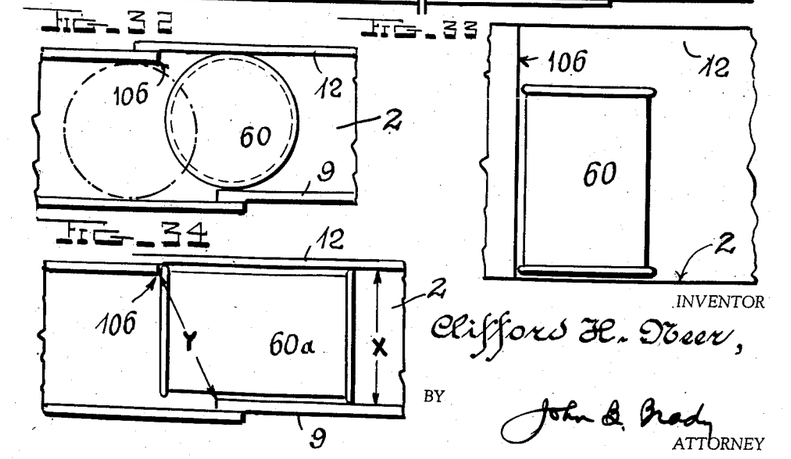
Fig. 32 is an enlarged plan view of one of the channels and showing how the cans detour around the vertical abutment at one side of the channel.
Fig. 33 is a fragmentary side elevational view of the arrangement shown in Fig. 32 illustrating the manner in which the cans move to the funnel chute in an erect position.
Fig. 34 is a view illustrating the manner in which the caser is blocked from operation if an can falls to a horizontal position on the conveyor during travel toward the funnel chute.

In Figs. 29 and 30 the structure of the latch 90 has been shown on an enlarged scale as being provided with a ground bottom edge 90b arranged at an angle with respect to the flat recessed support 90c in the side wall or separator plate. This angularly disposed edge gravitationally biases the latch to a position where can 60 is supported after the auxiliary plunger 25 returns to re-cycling position. In the form of my invention shown in Figs. 29 and 30 the spring is omitted and the latch falls by gravity only. This modified arrangement shown in Figs. 29 and 30 is used in those instances where the weight of the cans of the upper tier resting on the latch strips 90, 91, 92 and 93, plus the tension of springs 90a, 91a, 92a and 93a, is too severe for the lower tier of cans to overcome as they push upwardly into casing position.

Figs. 31, 32, 33 and 34 illustrate the manner in which the cans 60, in moving along rows 17, 18, 19 and 20, are prevented from reaching the funnel chute unless the cans are standing erect in proper position. If the cans have fallen to a horizontal position, indicated at 60a in Fig. 34, they are precluded from moving forward on conveyor 2 by abutment with the vertically extending edge of the interior of the side wall or a separator plate, as indicated at 106. The protruding edge 106 does not impede the movement of the cans if they are standing erect as in Figs. 21, 32 and 33, because the top and bottom beads of the cans serve as protruding flanges which readily detour around the protruding edge 106, maintaining the cans in vertically erect position and so spacing the cans from the edge 106 that no scraping of the label or printed matter on the can takes place. This is accomplished by maintaining the transverse distance at dimension X the same as transverse distance Y, so that the cans 60 can detour around the edge 106.

Throughout this specification where I have referred to the labels on the cans I intend to include all forms of marking on containers such as photolithographic and direct printing processes and other methods of ornamenting or applying impressions on the exterior of the cans. Regardless of whether the labels be of the paper-applied variety or by the directly applied method the casing method and machine of my invention assures the casing of the containers, without scoffing or other injury to the surfaces thereof, as the movement of the cans is always vertically upwardly into the carton, and whenever a container detours around a projecting edge, the flanges at the opposite ends thereof are depended upon for spacing the surface markings away from any shearing edge or surface.

While I have described my invention in certain of its preferred embodiments, I realize that modifications may be made, and I desire that it be understood that no limitations upon my invention are intended other than may be imposed by the scope of the appended claims.

What I claim as new and desire to secure by Letters Patent of the United States is as follows:

1. The method of filling receptacles which consists in positioning an empty receptacle in inverted substantially horizontal position with the open top arranged to receive articles to be packed and with the closed bottom maintained in a substantially horizontal plane over the open top of the receptacle, assembling articles to be packed in a multiplicity of aligned substantially horizontal rows of substantially the same heights, horizontally moving the horizontal rows of articles into assembled position below the open top of the receptacle moving a restraining abutment into contact with the exterior of the bottom of the receptacle, elevating the aligned articles while maintaining the row assembly thereof simultaneously through the open top of the inverted receptacle for loading the receptacle removing the restraining abutment from the exterior of the bottom of the receptacle, and subsequently reversing the position of the loaded receptacle.

2. The method of filling receptacles which consists in positioning an empty receptacle in inverted substantially horizontal position with the open top arranged to receive articles to be packed and with the closed bottom located in a substantially horizontal plane above the open top of the receptacle, assembling articles to be packed in a tier of aligned horizontal rows of substantially the same height, moving the said tier in a horizontal plane beneath the open top of the receptacle, where the depth of said receptacle is at least equal to twice the vertical height of the article to be packed, elevating the said tier of aligned rows of articles for a distance at least equal to the vertical depth of the tier and in alignment with the open top of the receptacle, maintaining the said rows of articles in elevated position, moving another tier of articles horizontally into position beneath the aforesaid elevated tier of articles, raising said first mentioned tier of articles supported by said second mentioned tier of articles simultaneously into the receptacle for loading the receptacle, clamping the receptacle against displacement while elevating the articles into the receptacles, unclamping the receptacle, and subsequently reversing the position of the receptacle.

3. The method of packing articles in receptacles which comprises maintaining a receptacle in reversed substantially horizontal position with its open top directed downwardly and its closed bottom extending in a substantially horizontal plane above the open top thereof, accumulating articles to be packed in a multiplicity of aligned horizontal rows of substantially the same height in a substantially horizontal tier below the open top of the receptacle and controlling, by the accumulation of the articles in the aligned horizontal rows of the tier of articles to be packed, the simultaneous vertical movement of the tier of articles through the open top of the receptacle, engaging the exterior of the receptacle for maintaining the receptacle stationary while the articles are being moved vertically therein and subsequently disengaging the receptacle for delivery thereof with the articles packed therein.

4. The method of packing articles in receptacles which comprises maintaining a receptacle in reversed position with its open top directed downwardly and its closed bottom extending in a substantially horizontal plane above the open top thereof, accumulating articles to be packed in a multiplicity of aligned rows of substantially the same height in a substantially horizontal tier below the open top of the receptacle, controlling by the accumulation of said articles the vertical upward movement of the tier of articles through the open top of the receptacle for a distance at least equal to the vertical height of the tier of articles to be packed, maintaining the said tier of articles to be packed in an elevated position below the open top of the receptacle, accumulating another tier of articles to be packed in aligned rows of substantially the same height beneath the aforesaid elevated tier of articles and controlling by the accumulation of the articles in said second tier the vertical upward movement of the articles in both of said tiers through the open top of the receptacle to a limiting position against the horizontally disposed bottom of the receptacle for loading the receptacle in inverted position, introducing an abutment engaging the exterior of the receptacle during the vertical upward movement of the articles into the receptacle, removing the abutment from the receptacle for delivery of the loaded receptacle, and subsequently reversing the position of the loaded receptacle.

5. A caser comprising a conveyor for horizontally moving articles in vertically erect arrangement aligned in substantially horizontal rows to a position beneath an inverted empty carton, means for elevating the articles so positioned in a vertical direction while maintaining the alignment of the article in the substantially horizontal row into the inverted carton for filling the carton, means operating in timed relation to the operation of the means for elevating the articles upwardly into the carton for engaging the exterior surface of the carton for maintaining the carton in position for receiving the articles, means for supporting the carton in filled position, and means for reversing the position of the filled carton.

6. A packing machine comprising a case loader having a substantially horizontally disposed support for receiving aligned rows of vertically erect packages in a horizontal layer of substantially the same height, means movable through said support for simultaneously elevating all of said packages, means for maintaining the alignment of the rows of packages of said horizontal layer in an elevated position, means for moving a second horizontal layer of similar packages of the same height into a position beneath the aforesaid layer of packages, means operating in timed relation to the movement of the packages upwardly into the carton for engaging the exterior surface of the carton for maintaining the carton in inverted position over said support for receiving the packages to be packed and means for vertically loading both of said layers of packages through the top of said inverted carton.

7. The method of loading receptacles which consists in maintaining a receptacle in inverted stationary position, aligning articles to be packed in vertically erect positions in substantially horizontal rows of substantially the same height, simultaneously moving the articles in horizontal paths into loading position beneath the open top of the receptacle, raising the articles vertically upwardly into the receptacle for loading the receptacle introducing an abutment against the receptacle in inverted position during the time period that the articles are being raised vertically upwardly into the receptacle, removing the abutment from the receptacle after the articles have been moved into the receptacle, supporting the packed receptacle and orienting the packed receptacle with the articles loaded therein for reversing the position of the loaded receptacle and discharging the loaded receptacle.

8. A caser comprising a frame, a funnel chute, means for supporting a receptacle in inverted stationary position, said receptacle having a downwardly directed open top disposed above said funnel chute for receiving articles to be packed through the downwardly directed open top thereof, a plunger having a portion thereof extending in a substantially horizontal plane beneath the downwardly directed open top of said receptacle, means for accumulating articles to be packed in vertically erect position on said plunger, means for vertically moving said plunger for vertically raising the articles accumulated thereon into said inverted stationary receptacle in loading position, means operating in timed relation to the vertically upward movement of said plunger for engaging the exterior surface of the inverted receptacle for maintaining the receptacle in loading position, means for disengaging said last mentioned means after the receptacle has been loaded, means for moving the receptacle with the articles loaded therein from the loading position and said funnel chute in a substantially horizontal plane, means embracing the loaded receptacle, means for righting the position of the loaded receptacle, and means for discharging the righted receptacle from said last mentioned means.

9. A caser as set forth in claim 8 which includes an auxiliary plunger normally coplanar with the aforementioned plunger and said conveyor, means for alternately loading articles to be packed on each of said plungers from said conveyor and means for moving said plungers in alternate timed relation for elevating articles to be packed vertically into said inverted receptacle.

10. A caser as set forth in claim 8 which includes an auxiliary plunger coacting with the first mentioned plunger and means for imparting vertically upward movement to said auxiliary plunger for elevating articles above the first mentioned plunger, and means for latching the articles elevated by said auxiliary plunger in a position above the first mentioned plunger at a distance approximately equal to the vertical height of the articles to be packed.

11. A caser as set forth in claim 8 which includes an auxiliary plunger coacting with the first mentioned plunger and means for imparting vertically upward movement to said auxiliary plunger for elevating articles above the first mentioned plunger, and means for latching the articles elevated by said auxiliary plunger in a position above the first mentioned plunger at a distance approximately equal to the vertical height of the articles to be packed, said first mentioned plunger operating to receive a second tier of articles to be packed, whereby vertically upward movement of said second tier of articles moves the latched articles into the open inverted receptacle.

12. A caser as set forth in claim 8 wherein pressure operated switches are mounted adjacent the inner limiting end of said funnel chute, said switches each being slidably engageable by said articles to be packed, a series electrical circuit controllable by said switches, and means controlled by said circuit for conditioning said caser for operation.

13. A caser as set forth in claim 8 in which said plunger comprises a plurality of spaced parallel extending supporting members and means disposed above said plunger comprising a plurality of side plates and separator plates disposed defining rows between which the articles to be packed are advanced to an aligned position for entering the receptacle, said supporting members extending between said side plates and separator plates.

14. A caser as set forth in claim 8 which includes an auxiliary plunger additional to said first mentioned plunger, both of said plungers including lineally extending supporting members interleaved with respect to each other, the supporting members of the auxiliary plunger being supported at one end with the other ends thereof free-ended and the supporting members of the first mentioned plunger being supported from the opposite end with the other ends thereof free-ended, and means for raising and lowering said auxiliary plunger in timed relation to the movement of said first mentioned plunger.

15. A caser as set forth in claim 8 in which the means operating in timed relation to the vertically upward movement of said plunger for engaging the exterior surface of the inverted receptacle comprises an abutment plate which establishes contact with the exterior of the bottom of the receptacle for restraining upward movement of the receptacle during the time period that the articles to be packed are elevated therein.

16. A caser as set forth in claim 8 in which the means for embracing the loaded receptacle are mounted to orient about a center adjacent the discharge end of said caser, a discharge conveyor, and means for orienting said last mentioned means from a position receiving the loaded receptacle to a position adjacent said discharge conveyor for discharge thereon.

17. A caser as set forth in claim 8 in which the means for embracing the loaded receptacle consists of a pair of adjustably spaced members extending in parallel planes for receiving the loaded receptacle therebetween and means for aligning said spaced members substantially parallel with the plane of said main plunger for receiving the loaded receptacle and substantially parallel with the plane of said discharge conveyor for discharging the loaded receptacle.

18. A caser as set forth in claim 8 in which the means for embracing the loaded receptacle is pivotally mounted for revolution through an angular distance of approximately 180° while the loaded receptacle is transferred from the discharge end of said caser to the released position.

19. A caser as set forth in claim 8 in which the means for embracing the loaded receptacle are suspended between the ends of a pair of arms, and means journaled between said arms for orienting the last named means through an angular distance of approximately 180°.

20. A caser as set forth in claim 8 which includes an auxiliary plunger in addition to said first mentioned plunger, means for confining the movement of said auxiliary plunger to vertical up and down movement and separate means for confining said first mentioned plunger to upward movement in a vertical path followed by translatory movement in a horizontal path followed by a return movement in a downward path followed by a return stroke in a horizontal path to the initial position thereof.

21. The method of packing articles in receptacles which comprises mounting a receptacle in a reversed substantially horizontal position with its open top directed downwardly and its closed bottom extending in a substantially horizontal plane spaced above the open top of the receptacle, accumulating articles to be packed therein in a substantially horizontal tier below the open top of the receptacle, simultaneously raising the articles vertically upwardly into said receptacle, applying a restraint against the exterior surface of the bottom of the receptacle for maintaining the receptacle in position for receiving the articles to be packed in timed relation to the raising of the articles into the receptacle and removing the restraint from the exterior surface of the receptacle subsequent to the loading of the articles to be packed into said receptacle and delivering the loaded receptacle.

References Cited in the file of this patent

UNITED STATES PATENTS

| | | |
|---|---|---|
| 797,752 | Roth | Aug. 22, 1905 |
| 797,753 | Roth | Aug. 22, 1905 |
| 1,243,407 | Hawthorne | Oct. 16, 1917 |
| 2,013,555 | Deeren | Sept. 3, 1935 |
| 2,069,926 | Reed | Feb. 9, 1937 |
| 2,596,339 | Lufkin | May 13, 1952 |
| 2,732,984 | Dans | Jan. 31, 1956 |